United States Patent [19]

Willis

[11] E Patent Number: Re. 32,287

[45] Reissued Date of Patent: Nov. 18, 1986

[54] PROTECTIVE FOOTBALL GLOVE

[76] Inventor: John R. Willis, 4505 Revillo Way, San Diego, Calif. 92115

[21] Appl. No.: 770,855

[22] Filed: Aug. 29, 1985

Related U.S. Patent Documents

Reissue of:

[64] Patent No.: 4,400,829
Issued: Aug. 30, 1983
Appl. No.: 337,966
Filed: Jan. 8, 1982

[51] Int. Cl.[4] ..... A41D 13/08
[52] U.S. Cl. ..... 2/16
[58] Field of Search ..... 2/16, 20, 161, 158, 2/168

[56] References Cited

U.S. PATENT DOCUMENTS

| | | | |
|---|---|---|---|
| 368,724 | 8/1887 | Loucks . | |
| 975,734 | 11/1910 | Tebeau . | |
| 1,796,319 | 3/1931 | Burden . | |
| 1,841,193 | 1/1932 | Lidston . | |
| 1,915,617 | 6/1933 | Potter . | |
| 2,011,362 | 8/1935 | Hayward . | |
| 2,068,182 | 1/1937 | Jackson . | |
| 3,066,306 | 12/1962 | Thomas . | |
| 3,217,332 | 11/1965 | Gross . | |
| 3,598,408 | 8/1971 | Klose . | |
| 3,605,120 | 9/1971 | Hobbs . | |
| 3,606,342 | 9/1971 | Albertson, Jr. | 2/161 |
| 3,626,515 | 12/1971 | Murray . | |
| 3,890,649 | 6/1975 | Diggins . | |
| 3,903,546 | 9/1975 | Rhee | 2/16 |
| 3,924,272 | 12/1975 | Allen et al. . | |
| 4,042,975 | 8/1977 | Elliott, Jr. et al. . | |
| 4,051,553 | 10/1977 | Howard | 2/161 A |
| 4,067,063 | 1/1978 | Ettinger | 2/16 |
| 4,183,098 | 1/1980 | Knowles, Jr. . | |
| 4,295,229 | 10/1981 | Clark et al. . | |
| 4,411,024 | 10/1983 | Hayes . | |

*Primary Examiner*—Doris L. Troutman
*Attorney, Agent, or Firm*—Fulwider, Patton, Rieber, Lee & Utecht

[57] ABSTRACT

A protective football glove is formed of a tough pliable casing for fitting across the back of the hand and wrist of the user. A thick resilient hand pad is contained in the casing on the back of the hand portion of the glove and a thinner resilient wrist pad is contained in the casing abutting the hand pad for fitting over the wrist of the user. A hinge point is formed between the hand pad and the wrist pad to permit flexing of the wrist. Finger loops extend between the sides of the casing at the outer end of the hand pad. A VELCRO strap means is provided at the inner end of the glove for adjustably fastening the glove in position on the user.

24 Claims, 5 Drawing Figures

FIG. 1
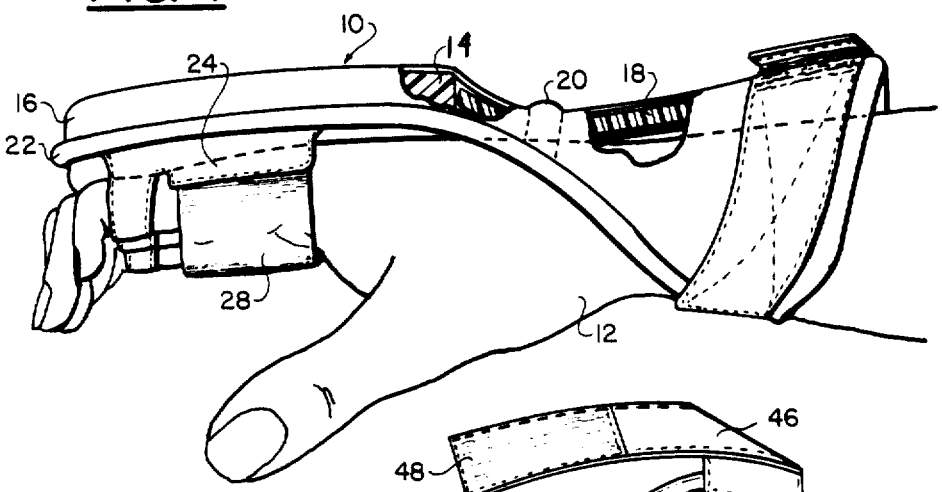
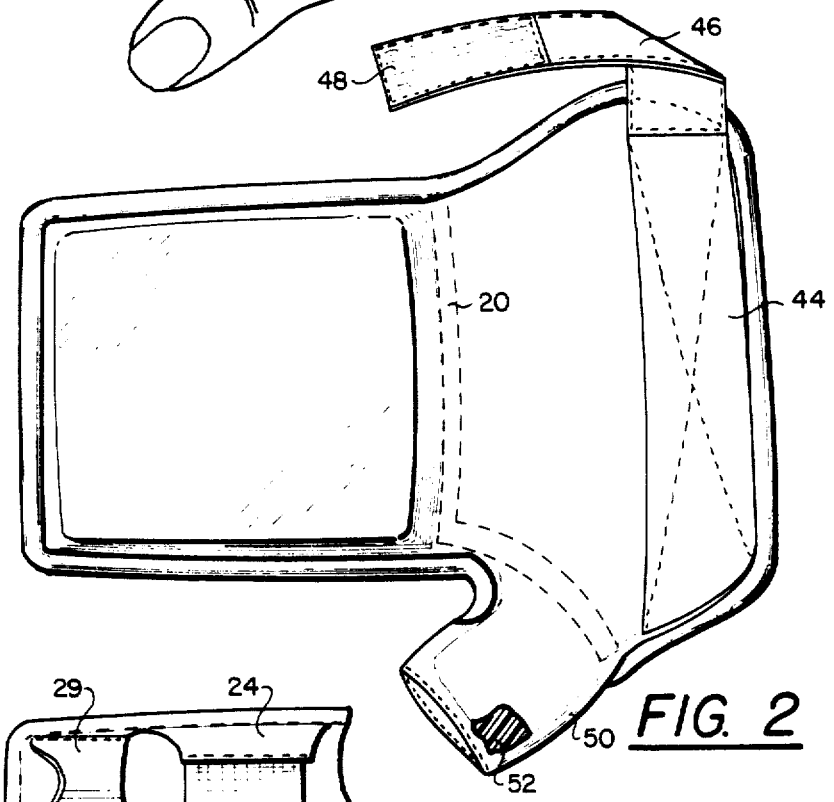
FIG. 2
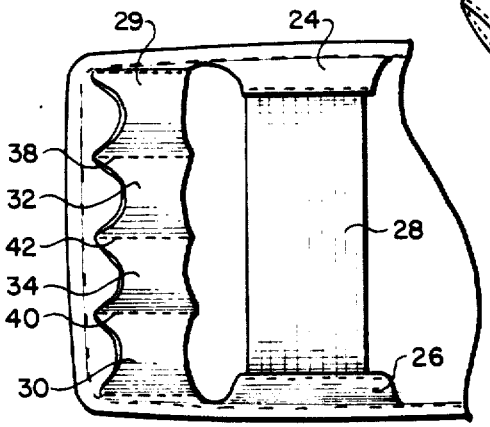
FIG. 3

FIG. 4
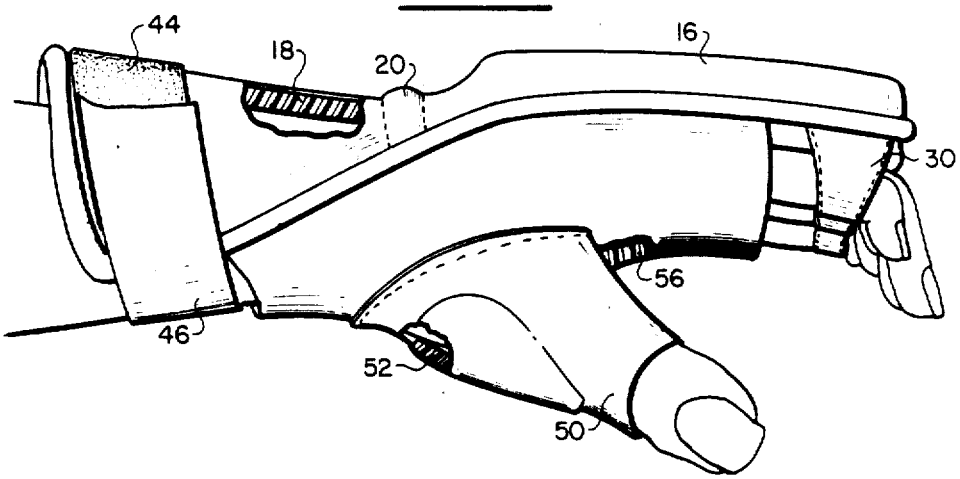
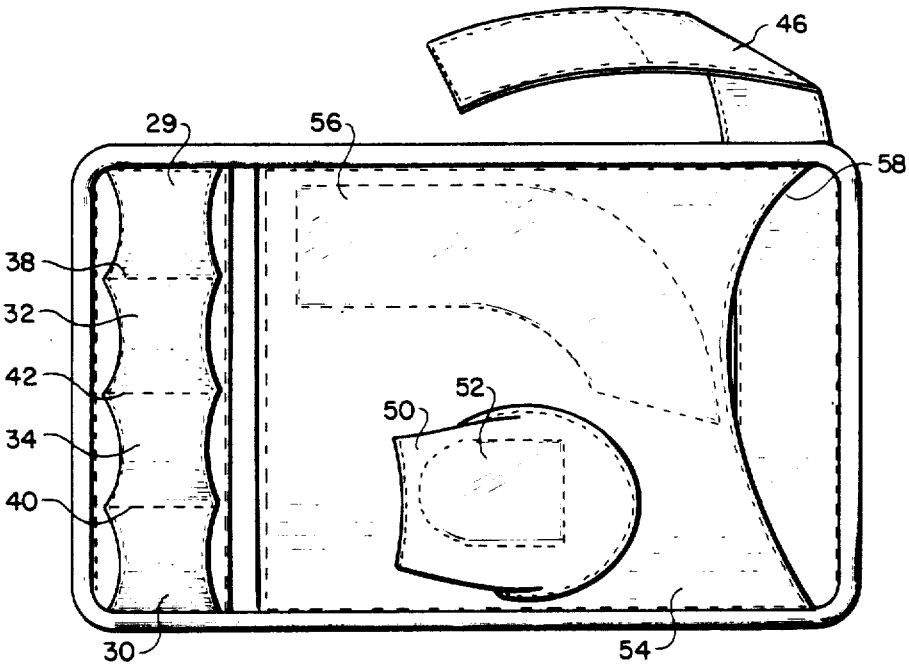
FIG. 5

PROTECTIVE FOOTBALL GLOVE

Matter enclosed in heavy brackets [ ] appears in the original patent but forms no part of this reissue specification; matter printed in italics indicates the additions made by reissue.

The present invention relates to a protective glove for athletes. Football injuries have occurred with increasing frequency in recent years due to the aggressive nature of the sport. This is particularly true with college and professional football. The hands are particularly susceptible to injury.

BACKGROUND OF THE INVENTION

Various types of gloves have been provided for hand protection in athletic events. U.S. Pat. No. 3,903,546 discloses a glove for striking sports such as karate. The outer shell is molded and is too stiff for football purposes because it prevents adequate hand moving and flexing. It has a stiff portion covering the wrist which prevents wrist flexing. The glove slides onto the hand and there is no means for securing it snugly to the wrist.

U.S. Pat. No. 3,890,649 shows a football glove that is similar to a baseball mitt with openings permitting the fingers and thumb to extend free without protection. It does not cover the wrist to give protection to the wrist.

U.S. Pat. No. 3,605,120 is directed to a training mitt that completely encloses the fingers. It is not suitable for effective play and does not provide wrist protection. The fingers are completely contained, and a player cannot remove the mitt by himself due to the lacing.

Another approach is shown in U.S. Pat. No. 3,924,272. It is similar to the application in U.S. Pat. No. 3,903,546 and has the same disadvantages. In addition, the device extends completely up to the elbow which renders it cumbersome and difficult to work with. It is aimed at training drills for using the arm in making contact.

U.S. Pat. No. 4,067,063 discloses a protective glove using a pneumatic guard. The guard extends over the wrist and although it protects the wrist, it prevents the wrist from flexing as required during play. The glove is secured by slipping it on and wrapping with tape. Thus, it is not easy to remove or adjust to different situations during a game. The football center, for example, needs a loose wrist strap for a long snap and a tight wrist strap for a short snap.

U.S. Pat. No. 4,295,229 shows a football glove wherein the hand pad extends well over the fingers, preventing freedom of finger movement. It includes double finger loops, thumb webs and a palm strap laced to the wrist strap. The thumb protection extends up the wrist. This glove is cumbersome and requires two people to put it on. The lacing prevents quick loosening of the wrist portion for ball handling.

A protective football glove is needed which will protect the portions of the hand and wrist most often subject to injury. Such a glove needs to be simple and sturdy. A player must be able to put it on and remove it by himself. The glove is required to permit wrist movement while at the same time providing good wrist protection.

SUMMARY OF THE INVENTION

The deficiencies of the prior art are overcome and the requirements for an effective commercial glove are met by the present invention that provides a glove of tough, flexible material containing a resilient hand pad extending across the back of the hand and covering the first knuckles of the fingers. Finger loop means are provided. Wrist protection means includes hinge means for permitting the wrist to flex. An adjustable fastening means at the wrist portion permits quick adjustment or removal by the player wearing the glove.

DESCRIPTION OF THE DRAWINGS

FIG. 1 is a side elevation partly sectioned and showing one embodiment of the protective football glove of the present invention on the hand of a user.

FIG. 2 is a back view of the glove shown in FIG. 1 with the strap opened and including a thumb guard.

FIG. 3 is a partial view of the palm of the glove shown in FIGS. 1 and 2.

FIG. 4 is a side elevation of another embodiment of the football glove of the present invention.

FIG. 5 is an elevation showing the palm side of the glove shown in FIG. 4.

DETAILED DESCRIPTION OF THE INVENTION

Referring to FIG. 1 of the drawings, a protective football glove 10 is shown attached in place on the hand 12 of the user. The glove includes a resilient rubber hand pad 14 contained in a casing 16 of tough leather. Although the pad is resilient, it is stiff enough to provide protection for the back of the hand. The hand pad covers the back of the hand and extends forward to a point that covers the first knuckle of the fingers. Experience has shown that this is an area that is often damaged by linemen on a football team. A thinner rubber wrist pad 18 of like stiffness extends from the end of the pad 14 to a point up the arm a short distance beyond the wrist. A hinge seam 20 is stitched through the wrist pad 18 and casing 16 to form a flexing point that permits ready flexing of the wrist of the user. The glove casing 16 is formed by a top portion and a bottom portion stitched together along the sides. A protective leather bead 22 is stitched around the periphery of the glove to prevent the seams of the glove from fraying and to afford additional wear resistance for the glove.

Hand pads one-half inch to one inch thick are best suited to linemen. Defensive backs prefer a hand pad about one-quarter inch thick. The wrist pad is thinner than the hand pad and is normally between one-eighth inch and one-half inch thick depending upon the size of the hand pad.

Leather side flaps 24 and 26 extend from the sides of the glove shown in FIGS. 1–3 of the drawings. A strong elastic band 28 is stitched to these side flaps and extends across the open palm of the glove so that the glove is held snugly in position without covering and restricting the palm of the hand. A finger loop 29 is formed on the side flap 24 and a finger loop 30 is formed on side flap 26. A leather band forms finger loops and is stitched in place at 38 and 40 over the free ends of the finger loops 29 and 30. The band is also stitched at 42 to divide the loops 32 and 34. Thus, the fingers are held firmly in position in the glove adjacent the strap 28 and this combination and positioning of features secures the protective pad 14 firmly to the back of the hand.

A strip of Velcro 44 is stitched to the back of the glove near the inner end. A fastening strap 46 is stitched to the glove and includes a Velcro section 48. The glove can be quickly and easily fastened in place, and adjusted or removed by the player, without help, by engaging or disengaging the Velcro portions 44 and 48. When a center is using the glove, he can adjust the strap 46 loosely for long snaps of the ball and adjust it more firmly for short snaps of the ball to give the required hand and wrist action while still providing good protection.

Some players prefer thumb protection and FIG. 2 of the drawings shows the glove of FIG. 1 with a thumb guard as an integral portion of the glove. The thumb portion 50 includes a rubber thumb pad 52, similar to the wrist pad 18, in the casing behind the thumb. The front part of the thumb guard 50 includes a thumb loop (not shown) similar to the finger loops. The hinge seam 20 extends below the pad 52 and provides a pivot line for the thumb. This embodiment of the glove is produced in models including the thumb portion and without the thumb portion.

FIGS. 4 and 5 of the drawings disclose another embodiment of the present invention including a hand pad 14 on the back of the glove and the finger loops 29, 30, 32 and 34. The face of the glove in this embodiment differs in that a leather palm cover 54 is stitched at the sides of the glove and extends across the face of the glove. The palm cover contains a rubber palm pad 56 extending along the little finger side of the hand and curving toward the center of the hand at the bottom in a half horseshoe configuration. This portion of the hand has a large number of fine bones that are easily damaged. The palm pad covers the downward extension of the little finger on the front and side on that side of the hand and terminates at substantially the middle of the hand at the bottom. The pad is normally about one-quarter inch thick.

This palm pad provides a good cushion pushing surface for pushing the opponent without damaging the hand. The hand is not unduly restricted because of the configuration of the palm pad. The bottom of the palm cover is cut upwardly in an arc 58 which aids wrist flexing. The glove shown in this embodiment is particularly good for linebackers providing them with the ability to push without damaging the hand while still leaving the hand flexible enough for tackling or gripping the ball.

The thumb portion 50 extends from the palm cover 54 and has a rubber pad 52 thereon to protect the thumb. The thumb pad is normally about one-quarter inch thick. A fastening strap 46 has a Velcro section that fastens on the Velcro section 44 on the back of the wrist portion of the glove. This embodiment includes the wrist protection pad 18, the hinge bead 20 and the protection bead 22 as in the other embodiments. The wrist pad 18 extends around the side of the wrists as in the other embodiments.

The present invention provides a lightweight, strong, protective football glove that permits finger and hand movement while being retained securely in place. The glove can be quickly and easily put on, adjusted or removed by the player himself without requiring assistance. Good protection is afforded with a glove that is not bulky and that feels good on the hand.

Having thus described my invention, I claim:

1. A protective football glove comprising:

a casing of tough pliable material for covering the back of the hand and extending from a point just past the first finger knuckles to a location before the wrist;

finger loops adjacent the outer end of said casing on the inner face thereof;

a hand pad of resilient material in said casing extending from the outer end of said glove to a point forward of the wrist for covering the back of the hand;

a wrist pad of resilient material in said casing and extending from a point inward from said hand pad to a point a short distance up the arm from the wrist;

a hinging bead between said hand pad and said wrist pad for accommodating wrist flexing;

wrist strap means extending from one side of said casing and having quick connect means thereon; and quick connect means on the back of said casing for connecting with said quick connect means on said wrist strap;

said quick connect means being adjustable.

2. A protective football glove according to claim 1 wherein a bead is provided around the periphery of the glove for protecting the periphery of the glove from damage.

3. A protective football glove according to claim 1 wherein the casing includes a thumb guard extending from one side of said glove and including a protective pad enclosed in said casing at the back of said thumb guard;

a thumb loop formed in the front of said thumb guard for securing the thumb of the user in position; and said hinging bead extends beneath said thumb guard to provide a hinge line for the thumb of the user.

4. A protective football glove for linemen according to claim 1 wherein the quick connect means on said wrist strap is a Velcro strip and the quick connect means on the back of said casing is a Velcro strip;

said Velcro strips providing an adjustable connection.

5. A protective football glove according to claim 1 wherein a palm cover extends across the face of the glove beneath said finger loops.

6. A protective football glove according to claim 5 wherein a palm pad of resilient material is positioned on said palm cover below the little finger loop, said palm pad extending inward toward the wrist portion and curving toward the center of the glove to provide a push pad in the general configuration of a half horseshoe.

7. A protective football glove according to claim 5 wherein a thumb pocket is formed on said palm cover, and a thumb pad of resilient material is provided on the surface of said thumb pocket.

8. A protective football glove according to claim 5 wherein a palm pad of resilient material is positioned on said palm cover below the little finger loop, said palm pad extending inward toward the wrist portion and curving toward the center of the glove to provide a push pad in the general configuration of a half horseshoe; and a thumb pocket is formed on said palm cover with a thumb pad of resilient material on the surface of said thumb pocket.

9. A protective football glove according to claim 8 wherein said palm cover is cut out at the bottom to accommodate wrist flexing.

*10. A protective football glove comprising:*

*a casing of tough pliable material for covering the back of the hand, said casing having an outer end forward*

*of the first finger knuckles to cover the same and extending rearwardly to a point up the arm a short distance beyond the wrist;*

*a hand pad of resilient material in said casing, said hand pad extending rearwardly from the outer end of said casing to a point forward of the wrist for covering the back of the hand;*

*a wrist pad of resilient material in said casing, said wrist pad extending from a point generally adjacent the rearward end of said hand pad to a point a short distance up the arm from the wrist;*

*a hinging bead extending through said casing and said wrist pad to accommodate wrist flexing;*

*finger loops adjacent the outer end of said casing on the palm face thereof;*

*wrist strap means extending from one side of said casing and having quick connect means thereon; and*

*complementary quick connect means for adjustably connecting with said quick connect means on said wrist strap to help secure said glove on the hand.*

*11. A protective football glove according to claim 10 wherein a bead is provided around the periphery of said glove for protecting the periphery of said glove from damage.*

*12. A protective football glove according to claim 10 including an elastic band extending across the palm face of said casing, said elastic band being situated rearwardly of said finger loops to help hold said glove snugly in position without covering and restricting the palm of the hand.*

*13. A protective football glove according to claim 10 wherein said casing includes a thumb guard extending from one side of said glove and including a protective pad enclosed in said casing at the back of said thumb guard;*

*a thumb loop formed on the palm face of said thumb guard for securing the thumb of the user in position; and*

*said hinging bead extends beneath said thumb guard to provide a hinge line for the thumb of the user.*

*14. A protective football glove for linemen according to claim 10 wherein said quick connect means on said wrist strap and said complementary quick connect means are Velcro strips.*

*15. A protective football glove according to claim 10 including a palm cover extending across the palm face of said glove and rearwardly of said finger loops.*

*16. A protective football glove according to claim 15 wherein a palm pad of resilient material is positioned on said palm cover below the little finger loop, said palm pad extending rearwardly toward the wrist portion and curving toward the center of the glove to provide a push pad in the general configuration of a half horseshoe.*

*17. A protective football glove according to claim 15 wherein a thumb pocket is formed on said palm cover, and a thumb pad of resilient material is provided on said thumb pocket.*

*18. A protective football glove according to claim 15 wherein said palm cover is cut out at its rearward end to accommodate wrist flexing.*

*19. A protective football glove comprising:*

*a casing of tough pliable material for covering the back of the hand, said casing having an outer end forward of the first finger knuckles to cover the same and extending rearwardly to a point up the arm a short distance beyond the wrist;*

*a hand pad of resilient material in said casing, said hand pad extending rearwardly from the outer end of said glove to a point forward of the wrist for covering the back of the hand;*

*a wrist pad of resilient material in said casing, said wrist pad extending from a point generally adjacent the rearward end of said hand pad to a point a short distance up the arm from the wrist;*

*a hinging bead between said hand pad and said wrist pad for accommodating flexing of said glove;*

*finger loop means adjacent the outer end of said casing;*

*wrist strap means extending from one side of the rearward portion of said casing and having quick connect means thereon; and*

*complementary quick connect means on the rearward portion of said casing for adjustably connecting with said quick connect means on said wrist strap.*

*20. A protective football glove according to claim 19 wherein a bead is provided around the periphery of the glove for protecting the periphery of the glove from damage.*

*21. A protective football glove according to claim 20 including an elastic band extending across the palm face of said casing, said elastic band being situated rearwardly of said finger loop means to help hold said glove snugly in position without covering and restricting the palm of the hand.*

*22. A protective football glove according to claim 21 wherein said casing includes a thumb guard extending from one side of said glove and including a protective pad enclosed in said casing at the back of said thumb guard, a thumb loop formed on the palm face of said thumb guard for securing the thumb of the user in position, and wherein said hinging bead extends beneath said thumb guard to provide a hinge line for the thumb of the user.*

*23. A protective football glove according to claim 19 including a palm cover extending across the palm face of said glove and rearwardly of said finger loop means, and a palm pad of resilient material positioned on said palm cover below the little finger portion of said loop means, said palm pad extending rearwardly toward the wrist portion and curving toward the center of the glove to provide a push pad in the general configuration of a half horseshoe.*

*24. A protective football glove according to claim 23 wherein a thumb pocket is formed on said palm cover, and a thumb pad of resilient material is provided on said thumb pocket.*

* * * * *